Figures 6, 7:
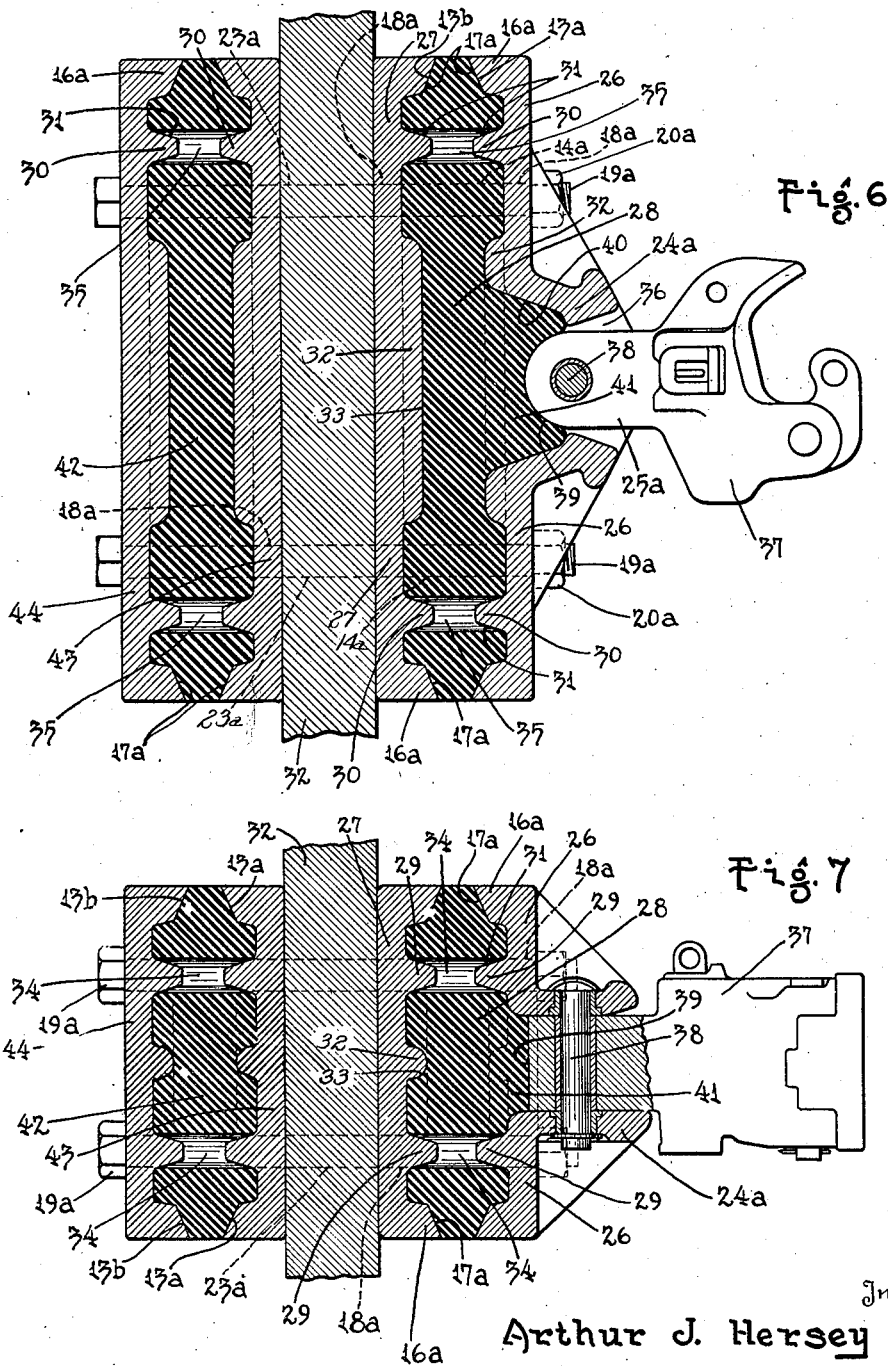

Jan. 25, 1944.  A. J. HERSEY ET AL  2,340,187
CUSHIONING DEVICES FOR ABSORBING SHOCKS
Filed Nov. 8, 1940  3 Sheets-Sheet 1
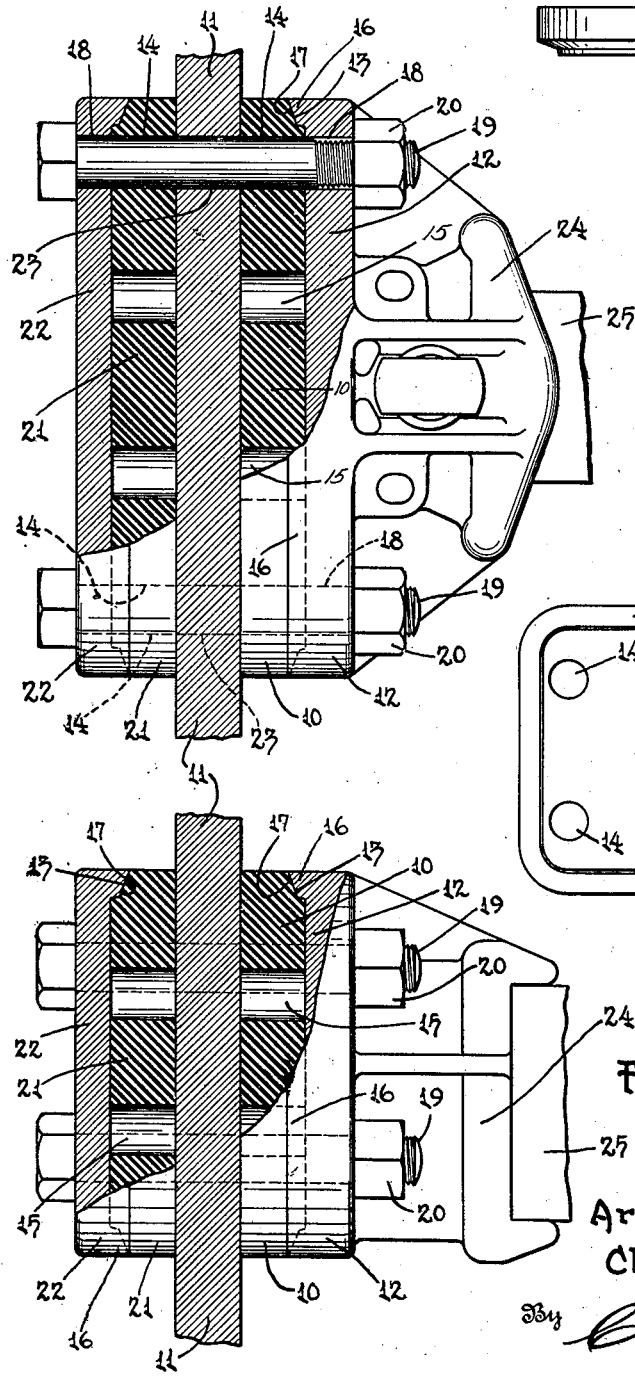
Inventors
Arthur J. Hersey and
Charles L. Madden
By Caswell & Lagaard
Attorneys Jan. 25, 1944.  A. J. HERSEY ET AL  2,340,187
CUSHIONING DEVICES FOR ABSORBING SHOCKS
Filed Nov. 8, 1940  3 Sheets-Sheet 2

Inventors
Arthur J. Hersey and
Charles L. Madden
By Caswell & Lagaard
Attorneys

Jan. 25, 1944.   A. J. HERSEY ET AL   2,340,187
CUSHIONING DEVICES FOR ABSORBING SHOCKS
Filed Nov. 8, 1940   3 Sheets-Sheet 3
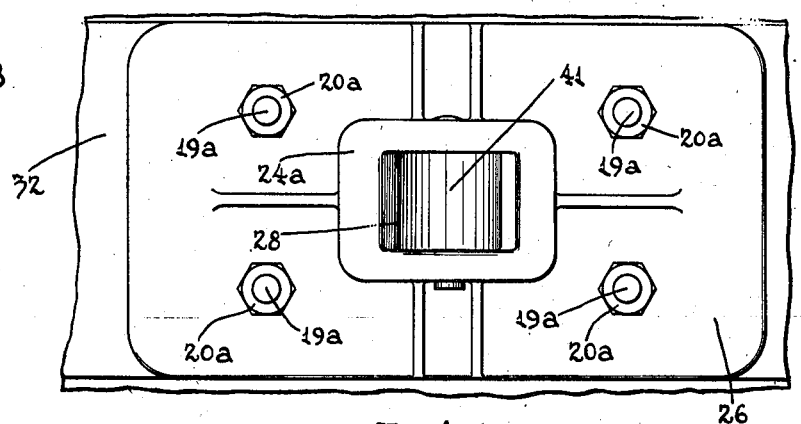
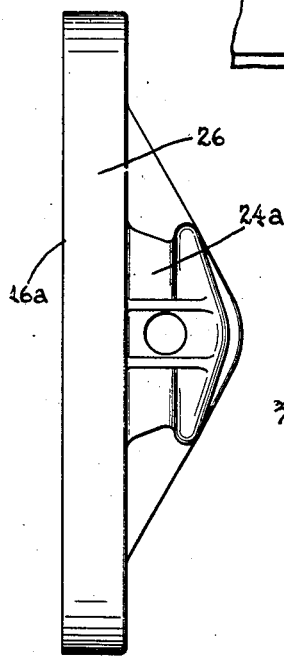
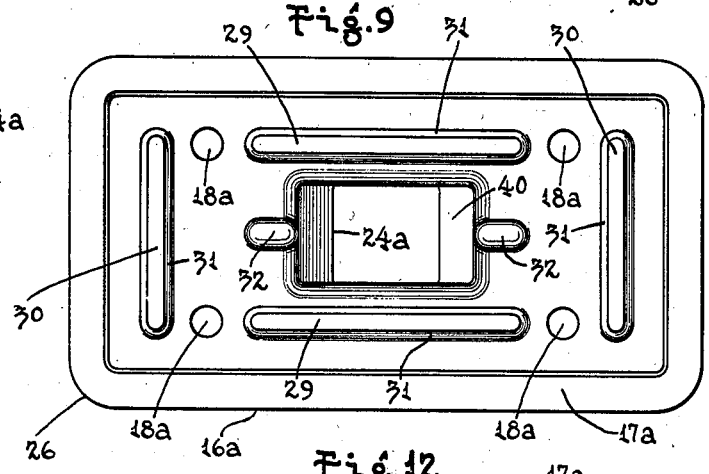
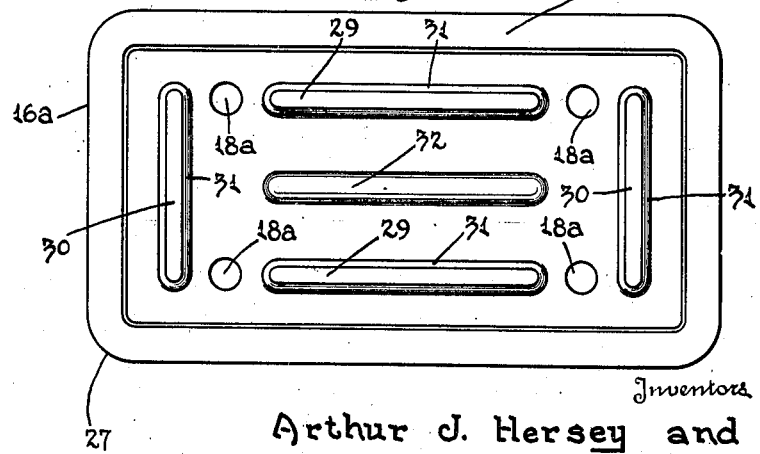
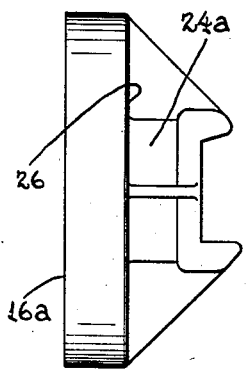
Inventors
Arthur J. Hersey and
Charles L. Madden
By Crowell & Lagaard
Attorneys Patented Jan. 25, 1944

2,340,187

UNITED STATES PATENT OFFICE 2,340,187

CUSHIONING DEVICE FOR ABSORBING SHOCKS

Arthur J. Hersey and Charles L. Madden, Minneapolis, Minn.

Application November 8, 1940, Serial No. 364,898

16 Claims. (Cl. 213—46)

Our invention relates to improvements in cushioning devices for absorbing shocks and, particularly, though not exclusively, to improvements in such devices for use as draft gears in railway vehicles.

An object of the invention is to provide simple, durable and compact devices of the present nature which are capable of efficiently cushioning shocks or blows and in which metal to metal contact is avoided in meeting the blows directed against such devices.

Another object of the invention is to provide a device of the instant character including an assembly consisting of a cushion-block of rubber or other resilient material and a force-receiving follower-plate and further including anchoring means for tying the assembly to a mounting therefor, an additional object of the invention being to provide such an assembly, wherein the material of the cushion-block is flowable under pressure and under increasing resistance as pressure on the follower-plate increases.

Another object of the invention is to supply means for adjustably pre-compressing the cushion-block for initially tensioning the material thereof to meet the requirements imposed upon the device in any particular usage to which it may be put, a further object of the invention being to so adapt the anchoring means of the device that such means will serve said purpose of adjustably compressing and initially tensioning the material of the cushion-block.

Another object of the invention is to provide anchoring means for the cushion-block and follower-plate assembly so devised and arranged that said means will function to retain said parts of said assembly in their proper relative relationship and also, if desired, will function to impede the flow of the material of the cushion-block under compression.

A further object of our invention is to supply a device of the instant character in forms constituting durable, efficient, compact and relatively inexpensive draft gears for railway vehicles, it being more specifically an object of our invention to provide an improved draft gear adapted to be carried by a frame plate or other mounting member of a locomotive or other car, to cushion the shocks or blows one way, or both ways.

Additionally, it is an object of this invention to provide an embodiment thereof adapted for use as a two-way shock absorbing draft gear, wherein cushion-block and follower-plate assemblies are supported by and upon opposite sides of the mounting member of the car, through the anchoring means, in mutually counterbalancing relationship, a further object of the invention being to provide such a structure in which the initial tensioning of the material of the blocks of both assemblies may be adjustably effected simultaneously, through said anchoring means.

With the foregoing and other objects in view, which will appear in the following description, the invention resides in the novel combination and arrangement of parts and/or in the details of construction hereinafter described and claimed.

In the drawings, Fig. 1 is a plan view of a relative light-duty draft gear in embodiment of our invention, the same being partly broken away to disclose its internal construction and being shown as applied to the end plate of a car; Fig. 2 is a side elevational view of the draft gear shown in Fig. 1, said view being also partly broken away to disclose the internal construction of the device; Figs. 3, 4 and 5 are detail views of one of the two identical cushion-blocks shown in Figs. 1 and 2, Fig. 3 being a front elevational view, Fig. 4 a plan view and Fig. 5 an end elevational view of such cushion-block; Fig. 6 is a horizontal central sectional view of a relatively heavy-duty draft gear in embodiment of our invention, the same being shown as applied to the end plate of a car; Fig. 7 is a vertical central sectional view of the structure shown in Fig. 6; Fig. 8 is a front elevational view of such structure, the coupler illustrated in Figs. 6 and 7 being omitted; Fig. 9 is a rear elevational view in detail of the force-receiving follower-plate shown in front elevation in Fig. 8; Figs. 10 and 11 are also detail views of said follower-plate, Fig. 10 being a plan view thereof and Fig. 11 being an end elevational view; Fig. 12 is an elevational view of the inside face of one of the three identical plates, two of which are employed as back-plates in the front and rear assemblies of follower-plates and cushion-blocks shown in Figs. 6 and 7, and the third of which is employed as a force-receiving follower-plate in said rear assembly.

Reference being had to the drawings and particularly to Figs. 1 to 5, inclusive, thereof, it will be seen that the embodiment of our invention illustrated therein, includes a rectangular plate-like cushion-block 10 backed against a mounting 11 and further includes a follower-plate 12 backed against said cushion-block 10. The mounting 11 may comprise any suitable abutment and, as shown, may be an end-plate or other mounting-plate on a car. The cushion-block 10 is formed of rubber or other suitable resilient material and has its edge, at the front, perimetrically beveled, as at 13. Near its corners, the cushion-block 10 is formed with bolt-receiving holes 14 and at its central area, said cusion-block 10 is formed with flow-receiving openings 15. The follower-plate 12 has a perimetrical flange 16 formed at the back thereof, said flange being beveled, as at 17, in conformity with the bevel 13 at the perimeter of said cushion-block 10. Additionally, said follower-plate 12 is formed with bolt-receiving holes 18 registering with the holes 14 in the cushion-block 10. Four anchoring bolts 19, anchored to the mounting-plate 11, extend forwardly therefrom, like studs, the same being slidably received in the holes 14 of the cushion-block 10 and the holes 18 of the follower-plate 12. These bolts 19 are threaded and fitted with nuts 20 which bear against the outer face of the follower-plate 12. This follower-plate 12 is the force-receiving member of the assembly consisting of said member 12 and said cushion-block 10. A pull exerted on said follower-plate 12 is transmitted to the mounting-plate 11 through the medium of the anchoring bolts 19, while a thrust exerted against said follower-plate 12 is transmitted to the mounting-plate 11 through the medium of the cushion-block 10, which is compressed more or less depending upon the force exerted. Under compression, said material of said cushion-block 10 is caused to flow, such flowage being restricted at the perimetrical portion of said cushion-block 10 by the anchor bolts 19 and by the beveled flange 16 on the follower-plate 12. The bevel 17 on said flange 16, cooperating with the beveled edge 13 of the cushion-block 10, sets up a progressively increasing resistance to the flow of the cushion-block material, thus tensioning such material and minimizing its capacity to flow, as the applied force continues to compress said cushion-block 10. The holes 15 may or may not be employed at the central area of the cushion-block 10. If employed, said holes 15, at least in part, accommodate the flowage of the material centrally of the cushion-block 10, thus minimizing the extent of flowage in the cushion-block as a whole and minimizing the tensioning of such material through the coaction of the beveled flange 16 of the follower-plate 12 with the beveled edge of said cushion-block 10.

The resilient cushion-block 10 is adjustably pre-compressed to tension the material thereof as may be desired to meet any particular use to which the device may be put, such pre-compression of said cushion-block 10 being readily effected by tightening the nuts 20 against the follower-plate 12.

An embodiment of our invention employing a single assembly consisting of the cushion-block 10 backed against the mounting 11 and the follower-plate 12 backed against said cushion-block, comprises a one-way shock-absorber which is readily resolved into a dual structure comprising a two-way shock absorber by duplicating said above-described cushion-block and follower-plate assembly and applying the duplicate assemblies to opposite sides of the mounting 11 with the anchoring bolts 19 applied to both assemblies and made slidable in said mounting. Such a two-way dual structure is shown in Figs. 1 and 2, the second assembly, in duplicate of the first described assembly, including the cushion-block 21 and follower-plate 22, the holes 14, 18 in said cushion-block and follower-plate loosely receiving the anchoring bolts 19, said bolts being, in turn, loosely received in bolt holes 23 in the mounting 11. In a dual structure, either follower-plate may be the force-receiving member and its particular assembly will cushion shocks under direct thrusts, while the companion assembly will cushion shocks under pulls transmitted to the follower-plate thereof through the anchoring bolts 19. Thus, each assembly, in effect, performs the function of a snubber in conjunction with the other assembly.

In an embodiment of our invention for use as a draft gear, whether such embodiment comprises a single cushion-block and follower-plate assembly or dual assemblies of cushion-blocks and follower-plates, the follower-plate, as at 12 in Figs. 1 and 2, forwardly of the car mounting-plate 11, will be formed with a coupler-pocket 24 to which is pivoted a coupler-shank 25.

In an embodiment of our invention employing a single cushion-block and follower-plate assembly, the anchoring bolts 19 tie the parts of the assembly together and to the mounting and support the assembly on the mounting. They slidably guide the mounting plate and, if extended through the cushion block, impede the flow of the material thereof. Further, said anchoring bolts 19 provide for adjustably pre-compressing the cushion-block to tension the material thereof, as may be desired under any given circumstances. Said bolts 19 function, as above, in an embodiment of the invention employing dual assemblies of cushion-blocks and follower-plates and, in addition, serve to support the two assemblies in counterbalancing relationship, also to transmit forces from the follower-plate of one assembly to the corresponding member of the other assembly and, further, provide for simultaneously pre-compressing the cushion-blocks of the two assemblies.

An important feature of the invention resides in the marked compactness afforded even in dual assembly construction, such compactness being vital in many applications of a shock absorbing structure of the present nature.

The embodiments of our invention having exemplification in whole or in part in the structure shown in Figs. 1 and 2, are particularly suited for relatively light duty, while the embodiments of said invention having exemplification in whole or in part in Figs. 6 and 7 are particularly suited for relatively heavy duty. Fundamentally, however, the basic features of such light-duty and heavy-duty structures are the same, the principal distinction lying in structural additions to the latter, whereby more effective resistance to the flowage of the cushion-block material is set up, and whereby the cushion-block for a coupler-bearing follower-plate is employed yieldingly to hold the coupler centered and secure against vibration on its pivot pin.

Referring to Figs. 6 and 7, it will be seen that a heavy-duty structure of a construction as therein shown includes not only a cushion-block and follower-plate, but also a back-plate in a single assembly of parts, or in each of the two assemblies, if duplicate assemblies are employed. In the one assembly, let the numeral 26 designate the follower-plate, 27 the back-plate, and 28 the cushion-block sandwiched therebetween. The follower-plate 26 has a typical back flange 16$^a$ beveled at 17$^a$ and is formed with typical bolt-receiving holes 18$^a$. It further has upper and lower horizontal ribs 29 and the vertical end ribs 30 at either side of the center of the follower-plate 26, all beveled as at 31 on both sides thereof and at their ends. An additional horizontal rib 32 is provided centrally of the follower-plate 26. This rib 32, as shown, is interrupted medially thereof for a purpose soon to appear. Except for the coupler-pocket 24ª and the medial interruption of the central horizontal rib 32, on the follower-plate 26, the back-plate 27 is a substantial duplicate of said follower-plate 26, said back-plate 27 having bolt holes 18ª therein and a perimetrical flange 16ª with a bevel 17ª. Further, said back-plate 27 has horizontal top and bottom ribs 29, a horizontal central rib 32, and vertical end ribs 30, said ribs 29 and 30 being beveled, as at 31, on both sides thereof and at their ends. Instead of backing the cushion-block 28 directly against the mounting 32, the back-plate 27 is backed against said mounting and the cushion-block 28, in turn, is backed against said back-plate 27. Said cushion-block 28 has its edge beveled at front and back, as at 13ª, 13ᵇ, in conformity with the bevel 17ª on the flange 16ª of the follower-plate 26 and the bevel 17ª on the flange 16ª of the back-plate 27. This cushion-block 28 is formed with grooves at either side thereof to receive the ribs on the back-plate 27 and follower-plate 26. The central horizontal grooves receiving the central horizontal ribs 32, of said members are designated by the numeral 33. Of the remaining grooves in the cushion-block 28, those which correspond with each other intercommunicate, such intercommunicating grooves constituting slots of uniform cross-sectional width. These slots for the upper and lower horizontal ribs 29 of the back-plate 27 and follower-plate 26 are designated by the numeral 34 and the slots for the vertical end ribs 30 of said back-plate 27 and follower-plate 26 are designated by the numeral 35. The upper bolt holes 18ª in the follower-plate 26 and in the back-plate 27 are located between the ends of the upper horizontal ribs 29 and the upper ends of the vertical end ribs 30 of said follower-plate and back-plate, and the lower bolt holes 18ª in the back-plate 27 and follower-plate 26 are located between the ends of the lower horizontal ribs 29, and the lower ends of the vertical end ribs 30 of said back-plate and follower-plate. Correspondingly, the upper bolt holes 14ª in the cushion-block 28 are located between the ends of the upper horizontal slots 34 and the upper ends of the vertical end slots 35, while the lower bolt holes 14ª in said cushion-block 28 are located between the ends of the lower horizontal slots 34 and the lower ends of the vertical end slots 35.

Upon the application of force to the follower-plate 26 leading to the compression of the cushion-block 28, the beveled flanges 16ª of said follower-plate 26 and the back-plate 27 cooperate with said cushion-block 28 to restrict the flow of the resilient material thereof and set up progressively increasing resistance against such flowage, whereby, as in the construction shown in Figs. 1 and 2, but with greater effectiveness, the material of the cushion-block 28 is tensioned to minimize the extent of compression of said cushion-block under the continuing application of force thereto through the follower-plate 26. Supplementing the progressive increase in resistance to the flowage of said cushion-block material is the like effect of the beveled ribs 29 of the back-plate 27 and follower-plate 26 in the cooperation with the cushion-block material at the walls of the slots 34, 35 in said cushion-block 28. The beveled surfaces 31 of said ribs 29, 30, as will be noted, diverge inwardly from their corresponding walls of said slots 34, 35. Thus, the progressively increasing resistance to the flowage of the cushion-block material is imposed thereon within the perimeter of the cushion-block 28 as well as at the perimeter thereof. And, too, as in the construction shown in Figs. 1 and 2, the anchoring bolts 19ª, in the construction shown in Figs. 6 and 7, serve to impede the flow of the cushion-block material, such impedance occurring in the same general confines defined by the upper and lower horizontal ribs 29, 30 of the back-plate 27 and follower-plate 28. Some leeway for internal flowage of the material of the cushion-block 28 is allowed, as provided for in the holes 15 in the central areas of the cushion-blocks of the construction shown in Figs. 1 and 2. This limited leeway for flowage of the material of the cushion-block 28 in the construction shown in Figs. 6 and 7, arises by virtue of the central voids within the slots 34, 35 in the cushion-block 28, which are left between the tips of the ribs 29, 30 of the back-plate 27 and follower-plate 26.

In addition to the restriction against the flowage of the cushion-block material set up by the beveled ribs 29, 30 of the back-plate 27 and follower-plate 26, said ribs 29, 30 have a function in common with the central ribs 32 of said back-plate and follower-plate. This function is to prevent, in large part, the flowage of the cushion-block material at the surface portions of the cushion-block or, in other words, to prevent skin-flowage of such material in the principal planes of contact between the cushion-block 28 and the companion back-plate 27 and follower-plate 26 assembled therewith. This feature of the invention removes any necessity for costly vulcanization of the cushion-block to its said companion members to prevent the frictional generation of heat therebetween, or to maintain the proper relationship between the parts of the assembly.

The coupler-pocket 24ª (Fig. 6) on the follower-plate 26 has an outer throat 36 which receives the end of the shank 25ª of a coupler 37, said shank 25ª being horizontally pivoted on a pin 38 mounted at its ends in the upper and lower walls of said coupler-pocket 24ª. The extremity 39 of said shank 25ª is circular in horizontal cross-section, the radial center thereof being in the axis of said pivot pin 38. Said coupler-pocket 24ª has an inner throat 40 into which an extension 41 of the cushion-block 28 extends. The terminus of this extension 41 of the resilient material of said cushion-block 28 conforms with and, under pressure, forcibly contacts the curved extremity 39 of the shank 25ª with the result that any lost motion between the pivot pin 38 and shank 25ª is yieldingly taken up and with the further result that the coupler 37 when swung "off-center," will be automatically returned to its normal position "on center." In this connection, it will be readily comprehended that any forceful swinging of the coupler 37 out of its normal "on center" position will be accompanied with surface stretching at the terminus of the cushion-block extension 41 and that retraction of the stretched resilient cushion-block material will, in the absence of an overbalancing force, return the coupler 37 to position "on center." Pre-compression of the cushion-block 28, through the media of the anchoring bolts 19ª and the nuts 20ª thereon, in addition to tensioning the material proper of cushion-block 28 to meet any particular usage of the device, may be effected also to tension the material of the cushion-block extension 41 to the degree desired for insuring the automatic centering the coupler 37.

Duplicate assemblies of cushion-blocks, back-plates and follower-plates of the construction shown in Figs. 6 and 7 may be employed to provide relative heavy-duty two-way absorbers with snubbing effected by one or the other of the assemblies upon action of the device either way, as in the dual light-duty construction shown in Figs. 1 and 2. In such a double-assembly heavy-duty structure, the added duplicating assembly (Figs. 6 and 7) will include a cushion-block 42 similar to the cushion-block 28 without the extension 41 and will also include a back-plate 43 similar to the back-plate 27. Further included will be a follower-plate 44 similar to the follower-plate 26 without the coupler-pocket 24ª. The individual performance of the duplicate assemblies will be substantially identical and their response to thrusts and pulls exerted against their respective follower-plates 26, 44, through the anchoring bolts 19ª, will be substantially the same as in the light-duty dual construction shown in Figs. 1 and 2, and hereinabove described in detail.

For some purposes, it will be readily comprehended that a single assembly made up of a cushion-block together with a follower-plate of the construction shown in Figs. 6 and 7, but without a back-plate, may be employed with satisfactory results, and, likewise, dual assemblies made up of such cushion-blocks and follower-plates without the back-plates may be employed satisfactorily. In such a single cushion-block and follower-plate assembly or in such dual assemblies of cushion-blocks and follower-plates, it will be preferred, in some cases, to omit the grooves at the back or backs of the cushion-block or cushion-blocks where it or they would otherwise bear directly against the mounting-plate.

In employing a back-plate, as at 27 or 43, together with a cushion-block, as at 28 or 42, and follower-plate, as at 26 or 44, in a single assembly, or in each of dual assemblies, an advantage is gained in that the back-plate or back-plates bearing against the mounting-plate 32 tend to reduce friction between the parts of the individual assemblies and the anchoring bolts 19ª and between said bolts and the mounting-plate 32 through which the bolts slidably extend. This tendency to reduce friction is the result of enlargement of the bearing surface on the anchoring bolts 19ª afforded through the addition of the one back-plate in a single assembly, whereby better alignment is attained between the axes of the anchoring bolts 19ª and the axes of the bolt holes 18ª in the back-plate and follower-plate, and further afforded through the addition of two back-plates in a dual assembly, whereby better alignment is attained between the axes of the anchoring bolts 19ª and the bolt holes 18ª in both of the back-plates and follower-plates and between said axes of said bolts and the axes of the bolt holes 23ª in the mounting-plate 32 through which said bolts 19ª slidably extend.

Obviously, the manifold functions performed by the anchoring bolts 19ª in a single back-plate, follower-plate and cushion-block assembly and in a pair of such assemblies of construction in the nature of that shown in Figs. 6 and 7, are the same as the functions performed by the anchoring bolts 19 in structures of both single and dual assemblies of the construction shown in Figs. 1 and 2.

From the foregoing description, many of the numerous advantages of our invention in various embodiments and applications thereof are readily to be comprehended. However, it is to be understood that embodiments and applications of our invention involving changes in the specific form thereof, as herein disclosed, may be made within the scope of what is claimed without departing from the spirit of our invention.

Having described our invention, what we claim as new and desire to protect by Letters Patent is:

1. In a draft gear for application to an upright mounting-plate on a car, an assembly including a back-plate, a follower-plate and a cushion-block therebetween, the back-plate being backed against said mounting-plate, the cushion-block being of resilient material and backed against the back-plate, the follower-plate being backed against the cushion-block, the cushion-block being grooved at either side thereof, the back-plate and follower-plate having ribs thereon received in said grooves in the cushion-block, said ribs serving substantially to prevent skin-flowage of the material of the cushion-block in its planes of contact with the back-plate and follower-plate, bolts extending from said mounting-plate and through said back-plate and follower-plate, said bolts serving to support said assembly on and anchor the same to said mounting-plate, and means on the follower-plate for attaching a coupler thereto.

2. In a draft gear for application to a mounting-plate on a car, a cushion-block of resilient material backed against said mounting-plate, a follower-plate formed with a coupler pocket thereon, a coupler swingably carried by the coupler pocket, said follower-plate being assembled with and backed against said cushion-block, and means for supporting the cushion-block and follower-plate assembly on and anchoring the same to said mounting-plate.

3. In a draft gear for application to a mounting-plate on a car, a cushion-block of resilient material backed against said mounting-plate, a follower-plate formed with a coupler pocket thereon, a coupler swingably carried by the coupler pocket, said follower-plate being assembled with and backed against said cushion-block, studs extending from said mounting-plate and through said follower-plate to anchor the cushion-block and follower-plate assembly to said mounting-plate, said studs having nuts threaded thereon and providing means for adjustably pre-compressing the cushion-block between the mounting-plate and follower-plate and initially tensioning the material of said cushion-block, said coupler pocket being substantially centered relative to the axes of said studs.

4. In a draft gear for application to a mounting-plate on a car, assemblies at the front and rear sides of said mounting-plate, each assembly including a cushion-block and a follower-plate, each cushion-block being of resilient material and backed against said mounting-plate and having the outer edge thereof beveled, each follower-plate being backed against its respective cushion-block and having a beveled flange thereon conforming with the beveled edge of such cushion-block, bolts slidably extending through said mounting-plate and through said follower-plates and serving to support said assemblies on and anchor the same to said mounting-plate and means on the follower-plate of the front assembly for attaching a coupler thereto.

5. In a draft gear for application to a mounting-plate on a car, front and rear assemblies at opposite sides of said mounting-plate, each assembly including a cushion-block and a follower-plate, each cushion-block being of resilient material and backed against its respective face of said mounting plate, each follower-plate being backed against its respective cushion-block, bolts slidably extending through said mounting-plate and through said follower-plates and serving to anchor said assemblies to said mounting plate, and means on the follower-plate of the front assembly for attaching a coupler thereto, said means being substantially centered relative to the axes of said bolts.

6. In a draft gear for application to a mounting-plate on a car, assemblies at the front and rear sides of said mounting-plate, each assembly including a cushion-block and a follower-plate, each cushion-block being of resilient material and backed against its respective face of said mounting-plate and perimetrically beveled at the front thereof, each follower-plate being backed against its respective cushion-block and having a beveled flange thereon conforming with the beveled portion of such cushion-block, each follower-plate cooperating with its respective cushion-block to set up progressively increasing resistance to the flow of the material thereof under the pressure of such follower-plate against such cushion-block, anchoring bolts slidably extending through said mounting-plate and through said follower-plates for tying the assemblies together and supporting them on said mounting-plate in counterbalancing relationship, and means on the follower-plate of the front assembly for attaching a coupler thereto.

7. In a draft gear for application to a mounting-plate on a car, assemblies at the front and rear sides of said mounting-plate, each assembly including a cushion-block and a follower-plate, each cushion-block being of resilient material and backed against its respective face of said mounting-plate and perimetrically beveled at the front thereof, each follower-plate being backed against its respective cushion-block having a beveled flange thereon conforming with the beveled portion of such cushion-block, each follower-plate cooperating with its respective cushion-block to set up progressively increasing resistance to the flow of the material thereof under the pressure of such follower-plate against such cushion-block, anchoring bolts slidably extending through said mounting-plate and through said follower-plates for tying the assemblies together and to said mounting-plate, said bolts having nuts threaded thereon and providing means for adjustably pre-compressing said cushion-blocks to initially tension the material thereof, and means on the follower-plate of the front assembly for attaching a coupler thereto.

8. In a shock absorbing device, a plate-like cushion-block of resilient material, a plate-like member against which said cushion-block is backed, a second plate-like member backed against the cushion-block, said members being relatively movable, one thereof having means cooperating with the cushion-block at its perimeter and one of said members having means cooperating with said cushion-block within the perimeter thereof, both means serving to set up progressively increasing resistance to the flow of the material of the cushion-block edgewise thereof under pressure between said members.

9. In a shock absorbing device, a plate-like cushion-block of resilient material, a member against which said cushion-block is flatly backed, a second member flatly backed against said cushion-block, said members being flatly movable toward and from each other, said cushion-block being perimetrically beveled at one face thereof, the member contacted by said face of said cushion-block having a beveled portion conforming with said beveled portion of the cushion-block and cooperating with said cushion-block to set up progressively increasing resistance to the flow of the material of the cushion-block edgewise thereof under compression of the cushion-block between said members, and adjustable means serving to bring said members together against the cushion-block for pre-compressing the latter and tensioning the material thereof under the increasing resistance to the flowage of the cushion-block material as effected by said beveled portion of the said member contacted by said beveled face of said cushion-block.

10. In a draft gear for application to a mounting-plate on a car, a cushion-block of resilient material backed flatly against said mounting-plate, a follower-plate having means thereon for the attachment thereto of a coupler, said follower-plate being assembled with and backed against said cushion-block, said cushion-block being beveled perimetrically at the face thereof facing said follower-plate, said follower plate having a beveled portion conforming with the beveled portion of said cushion-block and cooperating therewith to set up progressively increasing resistance to the flow of the material thereof under pressure of said follower-plate thereagainst, and means for anchoring the cushion-block and follower-plate assembly to said mounting-plate.

11. In a draft gear for application to an abutment on a car, an assembly including a back-plate backed against said abutment, a follower-plate, and a cushion-block of resilient material sandwiched between said back-plate and follower-plate, said cushion-block being beveled perimetrically at one face thereof, the plate facing said face of said cushion-block having a beveled portion conforming with said beveled portion of said cushion-block, said plate having said beveled portion cooperating with the cushion-block to set up progressively increasing resistance to the flow of the material of the cushion-block under pressure of the follower-plate against said cushion-block, means for anchoring the cushion-block and plate assembly to said abutment, and means on the follower-plate for the attachment thereto of a coupler.

12. In a draft gear for application to a mounting-plate on a car, a cushion-block of resilient material backed against said mounting-plate and perimetrically beveled at the front thereof, a follower-plate having means thereon for attaching a coupler thereto, said follower-plate being assembled with and backed against said cushion-block and having a beveled flange thereon conforming with the beveled portion of said cushion-block, the cushion-block being adapted to be compressed flatwise between the mounting-plate and follower-plate, the follower-plate cooperating with the cushion-block to set up progressively increasing resistance to the flow of material of said cushion-block edgewise thereof under pressure of the follower-plate against the cushion-block, and means extending from said mounting-plate and cooperating with said follower-plate to anchor the cushion-block and follower-plate assembly to said mounting-plate.

13. In a draft gear for application to an upright mounting-plate on a car, an assembly including a back-plate, a follower-plate and a cushion-block therebetween, the back-plate being backed against said mounting-plate, the cushion-block being of resilient material and backed against the back-plate and having the edges thereof beveled at front and back, the follower-plate being backed against the cushion-block, the back-plate and follower-plate each having a beveled flange thereon conforming with its corresponding beveled edge of the cushion-block, the cushion-block having a pair of relatively spaced slots therein, one above and one beneath the center thereof, said cushion-block having a second pair of relatively spaced slots, one at one side and one at the other side of the center thereof, the back-plate and follower-plate having ribs thereon projecting into the slots of the cushion-block, the faces of said ribs inwardly diverging from the adjacent walls of their respective slots, the ends of the upper and lower slots in said cushion-block terminating near the upper and lower ends, respectively, of the side slots in said cushion-block, two upper and two lower bolts extending from said mounting-plate and through said parts of said assembly, each upper bolt passing through the cushion-block at a point between the adjacent ends of the upper slot and one end slot therein and each lower bolt passing through the cushion-block at a point between the adjacent ends of the lower slot and one end slot in said cushion-block, said bolts serving to support said assembly on and anchor the same to said mounting-plate, and means on the follower-plate for attaching a drawbar thereto.

14. In a draft gear for application to an upright mounting-plate on a car, assemblies at the front and rear sides of said mounting-plate, each assembly including a back-plate, a follower-plate and a cushion-block therebetween, each back-plate being backed against said mounting-plate, each cushion-block being of resilient material and backed against its respective back-plate and having the edges thereof beveled at front and back, each follower-plate being backed against its respective cushion-block, each back-plate and follower-plate of each assembly having a beveled flange thereon conforming with the corresponding beveled edge of its respective cushion-block, each cushion-block having a pair of relatively spaced slots therein, one above and one beneath the center thereof, each cushion-block having a second pair of relatively spaced slots therein, one at one side and one at the other side of the center thereof, the back-plate and follower-plate of each assembly having ribs thereon projecting into the slots of their respective cushion-block, the faces of said ribs inwardly diverging from the adjacent walls of their respective slots, bolts slidably extending through said mounting-plate, follower-plates and back-plates, said bolts serving to support said assemblies on and anchor the same to said mounting-plate, and means on the follower-plate of the front assembly for attaching a coupler thereto.

15. In a draft gear for application to an upright mounting-plate on a car, assemblies at the front and rear sides of said mounting-plate, each assembly including a back-plate, a follower-plate and a cushion-block therebetween, each back-plate being backed against said mounting-plate, each cushion-block being of resilient material and backed against its respective back-plate and having the edges thereof beveled at front and back, each follower-plate being backed against its respective cushion-block, each back-plate and follower-plate of each assembly having a beveled flange thereon conforming with the corresponding beveled edge of its respective cushion-block, the back-plate and follower-plate of each assembly each having pairs of relatively spaced ribs thereon, the ribs of one pair extending in direction from end to end of their respective plate and the ribs of a second pair extending from top to bottom thereof, said cushion-blocks being grooved to receive said ribs, said ribs serving substantially to prevent skin-flowage of the resilient material of said cushion-blocks in the planes of contact between said cushion-blocks and their respective back-plates and follower-plates, bolts slidably extending through said mounting-plate, follower-plates and back-plates, said bolts serving to support said assemblies on and anchor the same to said mounting-plate, and means on the follower-plate of the front assembly for attaching a coupler thereto.

16. In a draft gear for application to an upright mounting-plate on a car, assemblies at the front and rear sides of said mounting-plate, each assembly including a back-plate, a follower-plate and a cushion-block therebetween, each back-plate being backed against said mounting-plate, each cushion-block being of resilient material and backed against its respective black-plate and having the edges thereof beveled at front and back, each follower-plate being backed against its respective cushion-block, each back-plate and follower-plate of each assembly having a beveled flange thereon conforming with the corresponding beveled edge of its respective cushion-block, each cushion-block having a pair of relatively spaced slots therein, one above and one beneath the center thereof, each cushion-block having a second pair of relatively spaced slots therein, one at one side and one at the other side of the center thereof, the back-plate and follower-plate of each assembly having ribs thereon projecting into the slots of their respective cushion-block, the faces of said ribs inwardly diverging from the adjacent walls of their respective slots, the ends of the upper and lower slots in each cushion-block terminating near the upper and lower ends, respectively, of the side slots in such cushion-block, two upper and two lower bolts slidably extending through said mounting-plate and said parts of said assemblies, each upper bolt passing through each cushion-block at a point between the adjacent ends of the upper slot and one end slot, and each lower bolt passing through each cushion-block at a point between the adjacent ends of the lower slot and one end slot, said bolts serving to support said assemblies on and anchor the same to said mounting-plate, and means on the follower-plate of the front assembly for attaching a coupler thereto.

ARTHUR J. HERSEY.
CHARLES L. MADDEN.